(12) United States Patent
Mead

(10) Patent No.: US 6,483,018 B2
(45) Date of Patent: Nov. 19, 2002

(54) METHOD AND APPARATUS FOR TEACHING PLAYING OF STRINGED INSTRUMENT

(76) Inventor: Carolyn Mead, 421 15th St., NE., Rochester, MN (US) 55906

( * ) Notice: Subject to any disclaimer, the term of this patent is extended or adjusted under 35 U.S.C. 154(b) by 0 days.

(21) Appl. No.: 09/915,115

(22) Filed: Jul. 25, 2001

(65) Prior Publication Data

US 2002/0011142 A1 Jan. 31, 2002

Related U.S. Application Data

(60) Provisional application No. 60/221,045, filed on Jul. 27, 2000.

(51) Int. Cl.$^7$ .............................................. G09B 15/02
(52) U.S. Cl. .................. 84/477 R; 84/470 R; 84/485 R
(58) Field of Search ............................... 84/293, 314 R, 84/470 R, 477 R, 485 R

(56) References Cited

U.S. PATENT DOCUMENTS

| | | | | |
|---|---|---|---|---|
| 1,751,048 A | * | 3/1930 | Miessner | |
| 3,978,756 A | * | 9/1976 | Feldman | 84/485 R |
| 4,417,497 A | * | 11/1983 | Nicklaus | 84/485 R |
| 4,559,861 A | * | 12/1985 | Patty et al. | 84/485 R |
| 4,712,464 A | * | 12/1987 | Nance | 84/485 R |
| 5,945,618 A | * | 8/1999 | Bennett | 84/485 R |
| 6,218,603 B1 | * | 4/2001 | Coonce | 84/485 R |

* cited by examiner

*Primary Examiner*—Jeffrey Donels
(74) *Attorney, Agent, or Firm*—William J. Ryan

(57) ABSTRACT

A chromatic fingerboard map is provided for teaching the playing of an unfretted stringed instrument such as a cello, violin, viola or bass, having strings extending from a nut at the top to a bridge at the bottom. The map contains a graphic representation of a fingerboard of such an instrument, including the strings, the relative location of the top of the fingerboard, the relative location of the bottom of the fingerboard and the relative location of the shoulder of the instrument. The finger locations of the harmonic notes are shown by a first symbol or indicia. The finger locations of the resonant notes are shown by a second indicia, with the resonant notes within each harmonic region of the fingerboard being shown by a separate, third indicia. In addition, the finger locations of the natural notes may be shown by a fourth indicia and marked with the letter corresponding to the note that is produced when the finger is placed at that location. The finger locations of the sharp and flat notes may be shown by a fifth indicia. By learning the relative locations of the harmonic notes and the resonant notes, the student is able to use such locations as landmarks to locate the finger locations of all notes. By reference to the map, the student is more readily able to learn the relative location of the notes along the fingerboard of the instrument, including the location of the resonant and harmonic notes, the relationship between pitch and the overtone series, and the confirmation of accurate pitch.

8 Claims, 5 Drawing Sheets

METHOD AND APPARATUS FOR TEACHING PLAYING OF STRINGED INSTRUMENT

REFERENCE TO RELATED APPLICATION

This application claims the benefit of U.S. Provisional Application No. 60/221,045 filed Jul. 27, 2000.

BACKGROUND OF THE INVENTION

The present invention relates to a method and apparatus for teaching the playing of unfretted stringed instruments in the violin family such as the violin, viola, cello and bass. More specifically, the present invention provides a method for teaching the design, organization, structure and use of the fingerboard of such instruments and a chart that is useful in conjunction with that method to illustrate the location of pitches and corresponding fingering on the fingerboard while playing such an instrument.

Instrument Construction

Stringed instruments in the violin family generally consist of a neck and a hollow, resonating body attached to one end of the neck. Four strings extend from the opposite end of the neck (the "peg box") over what is referred to as a nut to a bridge positioned on the mid portion of the body to a tailpiece positioned on the far end of the body. The strings extend over a fingerboard which extends along the front of the neck and the top portion of the body. A bow is used to vibrate the strings over the body, wherein the sound resonates. Specific pitches are produced on each string by drawing the bow over the strings and "stopping" the string by the player placing a finger at specific locations on the string along the fingerboard. By stopping a string at any point, the length of the vibrating portion of the string changes, resulting in a higher (shorter vibrating string portion) or a lower (longer vibrating string portion) pitch. In order to produce the desired notes, the player must be able to place his/her fingers on the strings at the appropriate locations on the fingerboard.

Acoustical Characteristics, Resonance Pattern

The vibrating string of an unfretted, bowed stringed instrument produces a complex musical tone that is composed of the basic frequency of the vibrating string and a series of higher frequencies. The basic frequency of the vibrating string is called the "fundamental." The frequencies that are produced simultaneously with the fundamental are called the "overtone series" or "harmonic series." An individual note in an overtone series or a harmonic series is referred to as an "overtone" or a "harmonic," respectively. The fundamental plus the overtone series comprise a complex musical tone.

The overtones produced in a given complex tone vibrate at frequencies that are whole number multiples of the frequency of the fundamental. For instance, in the case of the open A string of a cello, the fundamental frequency is 220 cycles per second, the ½ string harmonic is 440 cycles per second (2×220), the ⅓ string harmonic is 660 cycles per second (3×220), the ¼ string harmonic is 880 cycles per second (4×220), and the ⅙ string harmonic is 1320 cycles per second (6×220).

Each pitch played on the instrument is a complex tone that is comprised of the fundamental frequency and a complete overtone series. Harmonics can be played on any string by touching the string lightly with one finger at specific points that correspond to the overtones in the series. The location of each harmonic point ("node") divides the vibrating string into precise fractional segments that correspond with the ratio between the fundamental frequency and one of the corresponding overtone frequencies. For instance, the ½ string harmonic divides the string into two equal vibrating parts and produces a frequency equal to two times the fundamental frequency. Similarly, the ⅓ string harmonic divides the string into three equal parts and produces a frequency equal to three times the fundamental frequency; the ¼ string harmonic divides the string into four equal parts and produces a frequency equal to four times the fundamental frequency; and the ⅙ string harmonic divides the string into six equal parts and produces a frequency equal to six times the fundamental frequency. The harmonics divide each string into six harmonic regions: the first is located from the first or upper ¼ string harmonic and above, the second between the upper ⅓ and ½ string harmonics, the third between the ½ and lower ⅓ string harmonics, the fourth between the lower ⅓ and lower ¼ string harmonics, the fifth between the lower ¼ and lower ⅙ string harmonics, and the sixth below the lower ⅙ string harmonic. The complete sequence of natural tones is contained within each harmonic region.

Harmonics are located at the same points on each string. The same frequency ratio with the fundamental frequency is consistent on all strings. Each harmonic can be played individually.

A harmonic pitch is fixed according to the frequency ratio of the overtone series. Therefore, harmonics can be used as reliable reference points, or landmarks, for accurate pitch and the location of other pitches along a string.

The characteristic sound of a complex tone is a blend of the fundamental and the overtones in the series. The strongest and most easily heard overtones are produced at the ½ string harmonic, ⅓ string harmonic and ¼ string harmonic locations. Other overtones exist but are difficult to hear individually or are beyond the range of the ear.

An "interval" is the distance between two notes that are played simultaneously or separately. Each note in an interval is a complex tone with a distinct overtone series. The intervals that are most strongly related to the overtone series are the unison and the octave. A unison is comprised of two pitches with the same frequency. An octave is comprised of two pitches in which the upper note has a frequency twice that of the lower pitch.

When a string is vibrated at a frequency that is the same as, or is a whole number multiple of, another open (i.e., unstopped) string on the instrument, a "sympathetic vibration" will be imparted to the other strings. The note or tone produced by the other strings will reinforce or enrich the note or tone produced by the first string to produce a condition called "resonance." Resonance creates a particularly appealing sound, and verifies accurate pitch ("playing in tune") for the player. If the frequencies of the two interval notes do not match (i.e., are not a precise whole number multiple ratio), sympathetic resonance of the sound is reduced. The pitch is referred to as "out of tune." The degree to which pitches are adjusted to produce maximum resonance is referred to as "intonation."

Fingerboard Geography and Finger Logic

The location of pitches along a string ("fingerboard geography") and the corresponding placement of the player's fingers on the strings along the fingerboard must be learned by the player more or less intuitively since there are no visual reference points along the fingerboard (such as frets in the case of a guitar) to signal the player as to the appropriate location of the various pitches along the fingerboard.

In addition, learning the correct location and name of each pitch, and understanding the arrangement of notes on the fingerboard, is learned through the ear, hand/touch and visual memory. Individual pitches (notes with the same frequency) can be played at various locations on the fingerboard, on different strings ("alternate fingerings"). Knowing the arrangement of the possible notes on the entire fingerboard ("fingerboard geography") and the corresponding fingering while playing notes on one string and across strings ("finger logic") is an important factor in learning to play such an instrument.

PRIOR ART

The prior art methods of teaching the playing of a bowed, unfretted stringed instrument generally teach the location of pitches and the corresponding finger locations with reference to the location of the player's left hand along the fingerboard. The possible hand positions are referenced as "½", "1st", "2nd", "3rd", "4th", "5th", "6th", "7th" and "thumb" (in the case of cello and bass only) positions. Within each position, the fingers can play a range of notes on one string and by moving across the strings. Knowing the names, location and interval sizes (i.e., unison, octave, etc.) of each note within a designated range is referred to as "finger logic." The distance that the fingers can reach on one string without moving to a new position is called "hand span." This distance is measured in terms of half steps which correspond with the distance from one key to an adjacent key on a piano keyboard. With reference to the cello, each finger covers the distance of a half step. The distance from the index (first) finger to the little (fourth) finger is three half steps. The 1st position on the cello, for instance, is the hand position along the fingerboard where the index finger stops a string to play a pitch one whole step (two half steps) above the pitch produced on that string when it is unstopped or open. The little finger stops the string three half steps above the index finger. Similarly, the 4th position is the hand position where the index finger stops a string to play a pitch that is five tones (seven half steps) above the pitch produced by that open string. The little finger stops the string three half steps above the index finger and ten half steps above the open string.

These methods typically employ "fingerboard maps" intended to show the player the appropriate location of any given note and the corresponding fingering with respect to each hand position and a visual representation of the pitch/note using standard musical notation. Such fingerboard maps typically consist of a graphic depiction of the finger placement of each note for each hand position. These fingerboard maps are generally meant to be placed in front of the student while the instrument is played to be used as a reference rather than as read as music.

The fingerboard maps of the prior art either show the finger position of the various notes possible for each hand position on each fingerboard map, in which case a large number of fingerboard maps must be presented to the student to show the number of notes that might be played in that hand position, or a large number of hand positions and the corresponding notes must be shown on the same fingerboard map. In either case, the large amount of information conveyed to the student is difficult to sort out while playing the instrument and, as a result, difficult to learn.

In addition, the visual representation of the pitches/notes on such fingerboard maps is often difficult to translate into actual finger placement on the fingerboard while playing the instrument because of the different orientation of the fingerboard map and the fingerboard from the student's perspective. For instance, a fingerboard map may be placed on a vertical surface in front of the student (such as a wall) with the depiction of the fingerboard extending from left to right or from top to bottom. The player, however, will have a different orientation of the fingerboard when the instrument is held for playing. It is often difficult for the student to translate the finger position from that shown on the fingerboard map to the actual fingerboard because of that different orientation.

BRIEF SUMMARY OF THE INVENTION

The present invention is designed to present information to the student relating to the proper location of pitches and placement of fingers on the strings of an unfretted, bowed stringed instrument in a manner that is easily and quickly understood by the student.

It is one object of the present invention to provide a method of and apparatus for teaching the use or playing of an unfretted, bowed stringed instrument by reference to the location of the harmonics and resonant tones of the instrument as opposed to the location of the notes that can be played from any particular hand position.

It is another object of the present invention to provide a method of and apparatus for teaching the use or playing of an unfretted, bowed stringed instrument wherein the location of the resonant tones, harmonics and corresponding finger locations are easily and readily identified as reference points for accurate pitch.

It is another object of the present invention to provide a "sound map" depicting the finger locations of resonant tones and harmonics with respect to the fingerboard of an unfretted, bowed stringed instrument.

It is another object of the present invention to provide a "sound map" depicting the finger locations of natural and sharp/flat notes with respect to the fingerboard of an unfretted, bowed stringed instrument, wherein the natural notes and the sharp or flat notes (chromatic) are readily and easily distinguishable from one another.

It is another object of the present invention to provide a method of and apparatus for teaching the use or playing of an unfretted, bowed stringed instrument wherein identical notes playable at different locations along the fingerboard are similarly displayed to the player for easy and ready identification as alternative finger locations for such notes.

It is yet another object of the present invention to provide for alternative perspectives of a "sound map" according to the present invention to accommodate varying perspectives of different players.

To those ends, a chromatic fingerboard map is provided which illustrates the relative location of the various notes within the playing range of an unfretted, bowed stringed instrument. The fingerboard map illustrates the entire fingerboard of the instrument extending from the top (corresponding to the top of the fingerboard along the neck of the instrument) to the bottom (corresponding to the bottom of the fingerboard near the bridge). The map designates each of the four strings of the instrument and the name of each open string, labeled from low to high—C, G, D and A. The approximate location of the shoulder of the body of the instrument is shown for reference by the player. Along each string, the relative location for each pitch is shown. The locations of the natural notes (corresponding with the white keys on a piano) are shown by one type of symbol or indicia (i.e., a square) while the locations of the sharp/flat notes (corresponding to the black keys on a piano) are shown by another type of symbol or indicia (i.e., a circle). The fingerboard map is divided into four regions each defined by the location of the ½, ⅓ and ¼ string harmonics located along the fingerboard. The location of the resonant tones within each region are color coded (i.e., green, pink, blue and yellow) in such a manner that the corresponding resonant tones in each region are shown in the same color. In addition, the harmonics are designated by a third symbol or indicia (i.e., a star) for easy identification.

The present invention solves the problem of the fingerboard maps of the prior art in that, while it contains a complete set of information as to the location of all notes within the playing range of the instrument, such information is readily discernable with respect to any individual note because of the manner in which the information is visually presented.

DETAILED DESCRIPTION OF THE PREFERRED EMBODIMENT

Figure 1:
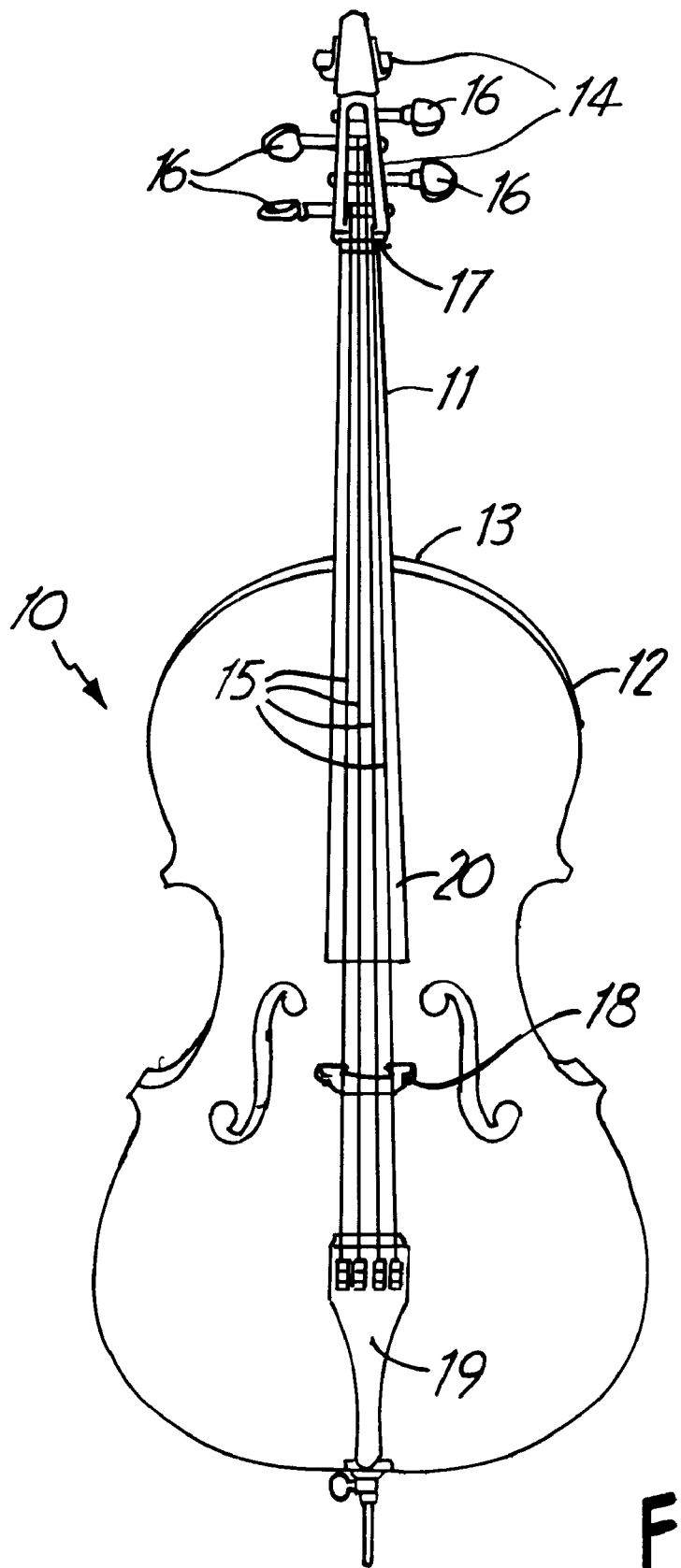
FIG. 1 shows a perspective view of a cello, which is representative of the types of unfretted, bowed stringed instruments with which the present invention has utility.

The description of the preferred embodiment of the present invention is best understood with reference to a typical unfretted, bowed stringed instrument such as a cello which is shown in FIG. 1. While reference will be made to the depicted cello, it will be understood that the present invention is equally useful for instruction in the use of a violin, a viola, or a bass.

Referring to FIG. 1, there is shown a cello generally designated by the numeral 10. The cello 10 comprises a neck 11 and a hollow, resonant body 12 attached to the lower end of the neck 11. The area of the body 12 connected to the neck 11 is referred to as the shoulder, shown at 13. The top of the neck 11 is referred to as the scroll and peg box, shown at 14. Four spaced strings 15 are each wound at one end around one of four pegs 16 located below the scroll 14. The strings 15 extend over a transverse bar or nut 17, which is notched to maintain the string spacing, down the neck 11 and across a bridge 18 on the body 12 to a tailpiece 19. A fingerboard 20 extends along the front of the neck 11 and the upper portion of the body 12, under strings 15. Pegs 16 are used to tighten the strings 15 to the desired degree of tension to produce the desired pitch. When a bow is drawn across a string 15, the string 15 will vibrate to produce a sound that resonates in the body 12. The quality of the sound produced by a vibrating string 15 can be altered by stopping the string 15 with a finger to in effect shorten the vibrating portion of the string 15 and thereby the frequency of its vibration (and the pitch of the sound produced). The position along a string 15 where it is stopped will determine the sound that is produced.

Learning the appropriate locations of the various notes and corresponding finger locations needed to play a musical piece is the key to learning to play an instrument. Many stringed instruments, such as the guitar, have frets or transverse bars along the fingerboard of the instrument that give the player a tactile and visual indication of the appropriate location of his/her fingers along the fingerboard. Instruments in the violin family are not fretted, however, and the player must be able to sense the proper finger locations without the use of frets or other tactile references. Instead, the player must rely on pitch and muscle memory. The present invention is designed to provide a graphic depiction of the location of all notes on the fingerboard that can be played on an unfretted, stringed instrument so as to assist the player in the proper location and proper placement of his/her fingers to produce the desired notes. Special emphasis is placed on enabling the player to easily identify the location of harmonics and resonant tones as pitch reference points such that the player is more readily able to verify accurate intonation and to locate the other notes in the vicinity of such reference points. The unisons, octaves, harmonics and resonant notes are designated in varying manners as the primary points of reference.

Figure 2:
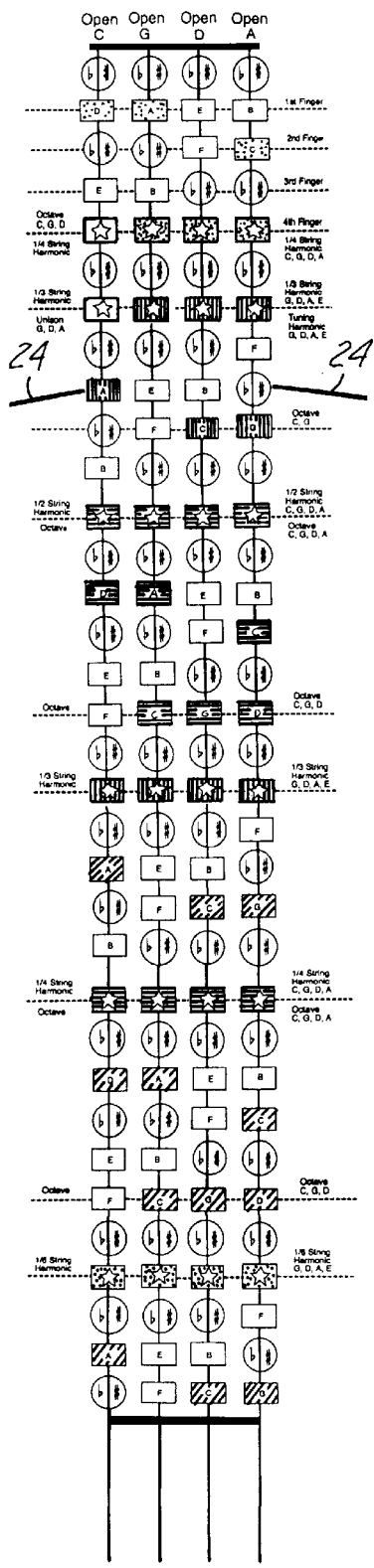
FIG. 2 shows a fingerboard map according to the present invention in what is referred to as the "audience view" which is a representation of a fingerboard as viewed from the audience's perspective.
Figure 3:
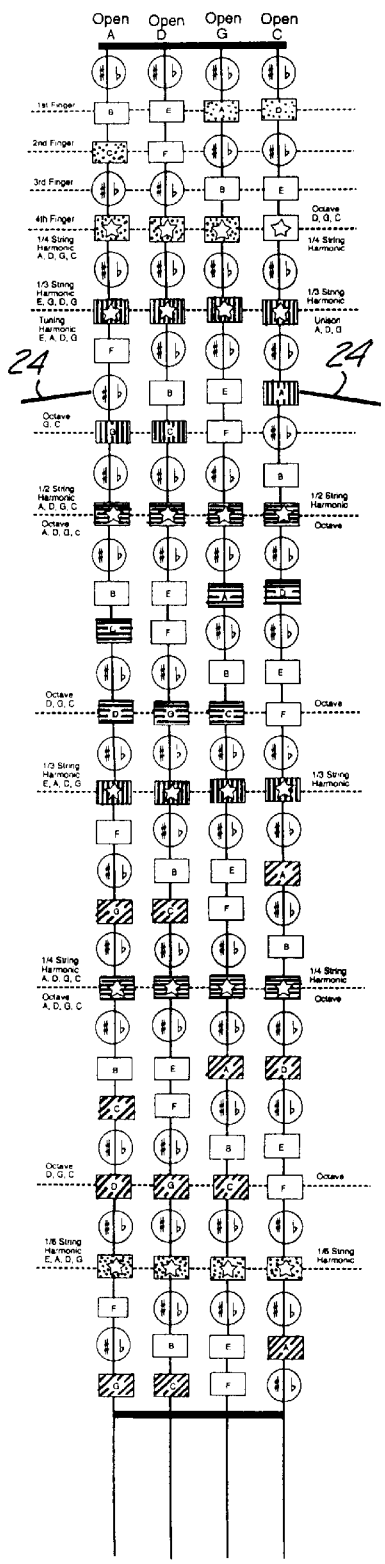
FIG. 3 shows a fingerboard map according to the present invention in what is referred to as the "mirror image" which is a representation reversed from that of the audience view.
Figure 4:
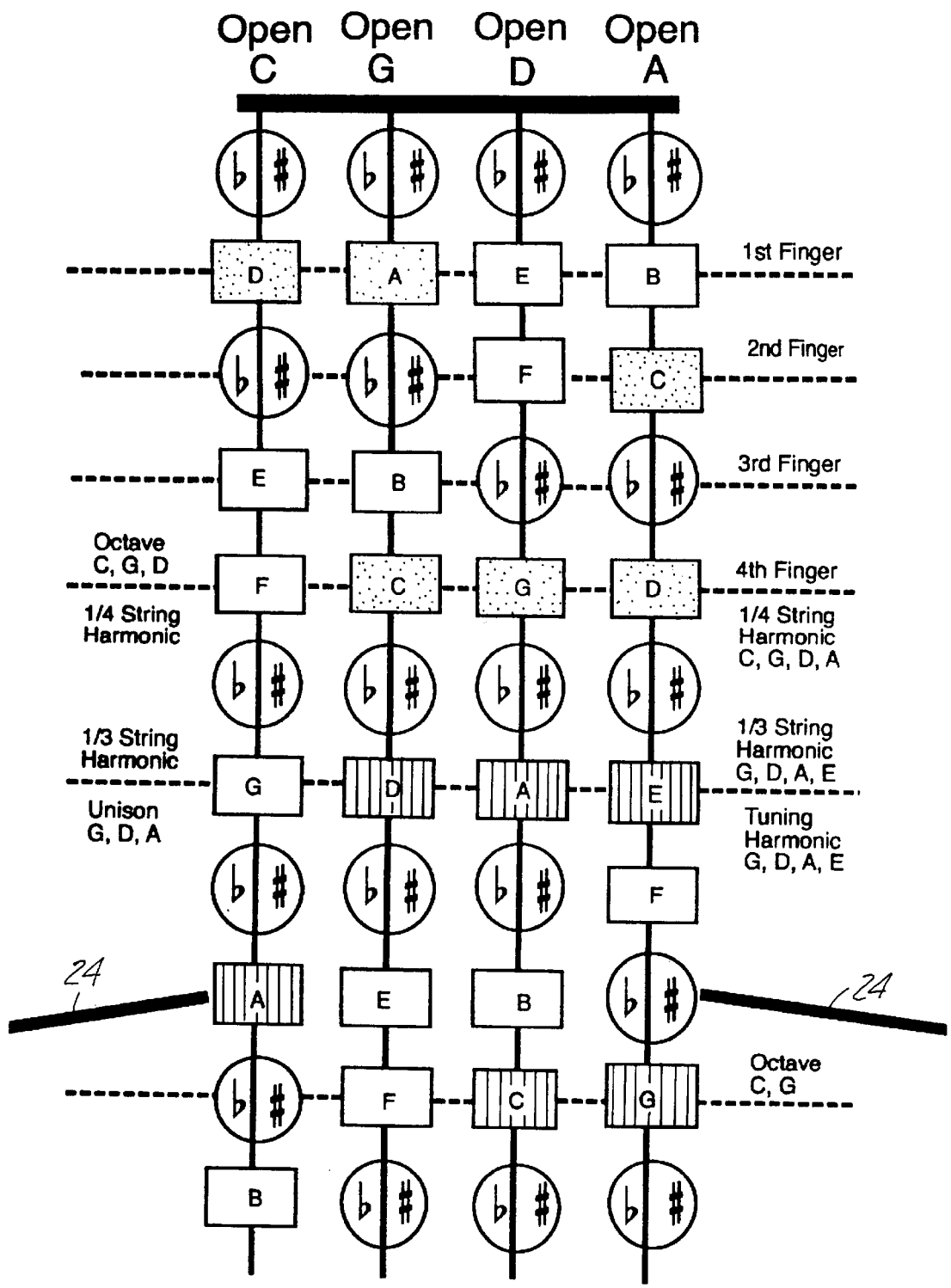
FIG. 4 shows a first portion of a fingerboard map according to the present invention.
Figure 5:
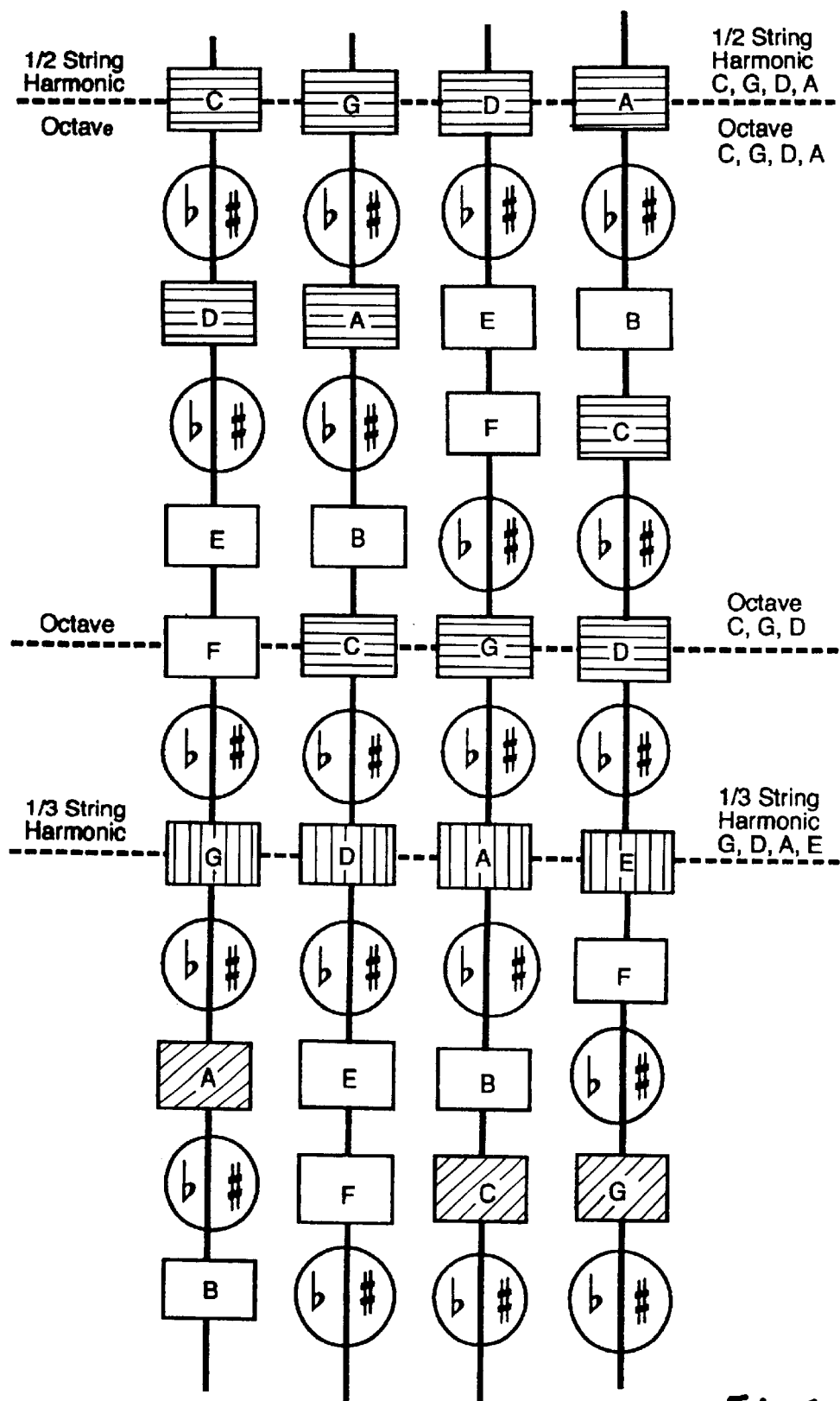
FIG. 5 shows a second portion of a fingerboard map according to the present invention.
Figure 6:
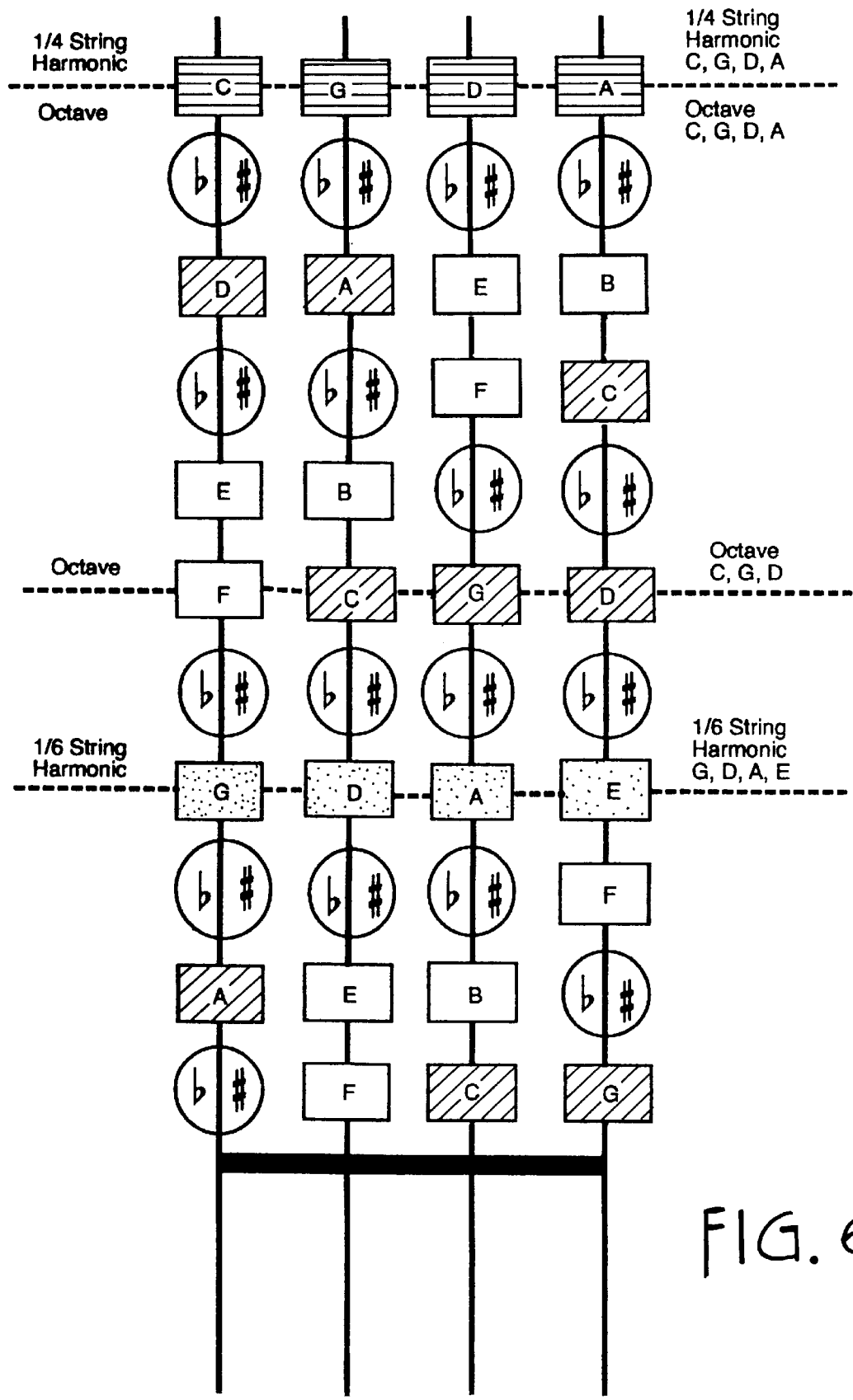
FIG. 6 shows a third portion of a fingerboard map according to the present invention.

Referring to FIGS. 2 and 3, there is shown a fingerboard map 21. The fingerboard map 21 in FIG. 2 is referred to as the "audience view" or a representation of a fingerboard 20 as the audience would see it during a performance (i.e., from the front of the instrument). The fingerboard map 21 in FIG. 3 is referred to as the "mirror image" or a reverse representation of the audience view. The inventor has found that because of the different orientation of the player with respect to the fingerboard 20, some players find the audience view easier to reference while playing an instrument, while other players find the mirror image easier to reference. In either case, the fingerboard maps 21 are identical except that one is reversed from the other.

The fingerboard map 21 depicts four strings 15 corresponding to the open strings C, G, D and A (low-high pitch), which extend from the top 22 of the fingerboard map 21 to the bottom 23. The top 22 represents the nut 17 of the instrument and the bottom 23 represents the bridge 18. The relative location of the shoulder 13 is also depicted on the fingerboard map 21 at a point 24 intermediate the top 22 and the bottom 23. This is important since the shoulder 13 is the only tactile reference as to the location of the player's hand along the fingerboard 20.

The relative locations of all pitches that can be played along each of the strings C, G, D and A are shown on each string 15. Natural notes are shown in one indicia, such as a square, while sharps and flats are shown by a second indicia, such as a circle. This helps the player differentiate the locations of the natural notes from the sharps or flats and visualize the distance between notes (i.e., half steps and whole steps) as well as the design of the entire fingerboard. The pattern of natural notes and sharp and flat notes corresponds with the arrangement of white and black keys on a piano. The natural notes are also labeled with the letter which corresponds to the note that is produced when a finger is placed on that string location and the string 15 is vibrated. The left side of the sharps and flats are labeled with the flat symbol to signify that the note that is produced by placing a finger on that string location is called a flat when progressing down the string (lengthening the vibrating string). Similarly, the right side of the sharps and flats are labeled with the sharp symbol to signify that the note that is produced by placing a finger on that string location is called a sharp when progressing up the string (shortening the vibrating string). In this manner, the enharmonic relationship between the sharps and flats are illustrated. For instance, an A sharp note is the same as a B flat note.

In addition, the fingerboard map 21 divides the fingerboard 20 into six harmonic regions or sections as designated by the locations of the ⅙, ¼, ⅓ and ½ string harmonics, one of the ¼ and ⅓ string harmonic locations being on each side of the ½ string harmonic location. The ¼ string harmonic locations represent a distance between the nut and the bridge equal to ¼ of the total length of the vibrating string 15. Similarly, the ⅓ string harmonic location represents a point one-third the distance from the nut and the bridge, and the ½ string harmonic location is at the mid point of the string 15. The ⅙, ¼, ⅓ and ½ string harmonic locations are important because they divide the fingerboard 20 into six regions. The first harmonic region (from the open string to the first or upper ¼ string harmonic) represents what is commonly referred to as first position. The second harmonic region (between the upper ⅓ string harmonic and the ½ string harmonic) represents what is commonly referred to as the fourth position. The third harmonic region (between the ½ string harmonic and the lower ⅓ string harmonic) represents what is commonly referred to as thumb position. The fourth harmonic region is between the lower ⅓ string harmonic and the lower ¼ string harmonic. The fifth harmonic region is between the lower ¼ string harmonic and the ⅙ string harmonic. The sixth harmonic region is between the ⅙ string harmonic and the bottom of the fingerboard. The fourth, fifth and sixth harmonic regions are collectively referred to as the high thumb position. Notes within the first, second and third regions can be played from the same hand position. Notes within the fourth, fifth and sixth regions are reached by moving ("shifting") the left hand to various locations. The ¼ string harmonic and ⅙ string harmonic are identified as pitch references within the high thumb position.

The resonant notes are designated by a common indicia such as color generally. The resonant notes playable from the first position, fourth position, thumb position and high thumb position of the fingerboard map 21 (i.e., the notes with frequencies corresponding to the whole number multiples of the frequency of notes produced by the open strings 15 of the instrument (C, G, D and A)) are designated by another common indicia, such as a specific color (i.e., green as shown in the drawing for the first position). For instance, the resonant notes playable in the first position are all designated by one color, while the resonant notes playable in the fourth position are all designated by a second color (pink as shown in the drawing), and so on. This provides the player with a ready reference as to the location of the resonant notes that may be played from the hand position corresponding to that region. The repeating pattern of resonant tones along the fingerboard 20 depicts the natural resonance pattern of the instrument based on the overtone series. This fingerboard design is the "sound map" (i.e., the aural map that guides the player in locating notes and verifying intonation). The sound map design is distinct from the chromatic pattern (i.e., a piano keyboard layout) depicted by square and circle indicia.

The fingerboard map 21 also designates the finger locations of the harmonics by yet another indicia, which in the preferred embodiment is a reflective star. The location of the harmonics occur at the ¼, ⅓ and ½ and ⅙ string harmonic locations. By designating the harmonics by yet another indicia, these reference points are also readily identifiable by the player.

By identifying the finger location of the harmonics and the resonant notes as landmarks along the fingerboard, the finger positions of all other notes can be more readily identified and located by the student. Similarly, by identifying the finger locations of the harmonics and resonant notes as landmarks along the fingerboard, the student is better able to identify the notes from which accurate pitch can be confirmed. And lastly, identifying the finger locations of the harmonics and the resonant tones, the student is better able to understand the relationship between the overtone series and accurate pitch.

What is claimed is:

1. An apparatus for teaching the playing of an unfretted stringed instrument having strings extending along a fingerboard from a nut positioned at one end of said fingerboard to a bridge located at the other end of said fingerboard, comprising a graphic representation of said fingerboard depicting:

(a) said strings of said instrument;
   (b) the relative location of the top of said fingerboard;
   (c) the relative location of the bottom of said fingerboard; and
   (d) the relative location of the shoulder of said instrument intermediate said nut and said bridge, wherein the finger locations of the harmonic notes are each shown by a common indicia.

2. An apparatus for teaching the playing of an unfretted stringed instrument having strings extending along a fingerboard from a nut positioned at one end of said fingerboard to a bridge located at the other end of said fingerboard, comprising a graphic representation of said fingerboard depicting:

(a) said strings of said instrument;
   (b) the relative location of the top of said fingerboard;
   (c) the relative location of the bottom of said fingerboard; and
   (d) the relative location of the shoulder of said instrument intermediate said nut and said bridge, wherein the octave and unison intervals are shown.

3. An apparatus for teaching the playing of an unfretted stringed instrument having strings extending along a fingerboard from a nut positioned at one end of said fingerboard to a bridge located at the other end of said fingerboard, comprising a graphic representation of said fingerboard depicting:

(a) said strings of said instrument;
   (b) the relative location of the top of said fingerboard;
   (c) the relative location of the bottom of said fingerboard; and
   (d) the relative location of the shoulder of said instrument intermediate said nut and said bridge, wherein the finger locations of the resonant tones are shown by a common indicia.

4. An apparatus according to claim 3, wherein the finger locations of the resonant notes within each harmonic region are shown by a separate, second indicia, said second indicia in any harmonic region being different than said second indicia in any other harmonic region.

5. An apparatus according to claim 3, wherein the finger locations of the resonant notes playable in the first position, the fourth position, the thumb position and the high thumb position are each shown by a second, third, fourth and fifth indicia, respectively.

6. An apparatus for teaching the playing of an unfretted stringed instrument having strings extending along a fingerboard from a nut positioned at one end of said fingerboard to a bridge located at the other end of said fingerboard, comprising a graphic representation of said fingerboard depicting:

(a) said strings of said instrument;

(b) the relative location of the top of said fingerboard;

(c) the relative location of the bottom of said fingerboard; and (d) the relative location of the shoulder of said instrument intermediate said nut and said bridge, wherein the finger locations of the natural notes are shown by a first indicia, the finger locations of the sharp and flat notes are shown by a second indicia, the finger locations of the harmonic notes are shown by a third indicia, and the finger locations of the resonant notes are shown by a fourth indicia.

7. An apparatus according to claim 6, wherein the finger locations of the resonant notes in each harmonic region are shown by a separate, fifth indicia, said fifth indicia in any harmonic region being different than said fifth indicia in any other harmonic region.

8. An apparatus according to claim 6, wherein said strings are depicted in either an audience view or a reverse view.

* * * * *